(12) United States Patent
Showa et al.

(10) Patent No.: US 11,118,628 B2
(45) Date of Patent: Sep. 14, 2021

(54) FLUID DYNAMIC BEARING DEVICE, SPINDLE MOTOR, AND HARD DISK DRIVE DEVICE

(71) Applicant: MINEBEA MITSUMI Inc., Nagano (JP)

(72) Inventors: Hideaki Showa, Nagano (JP); Daigo Nakajima, Tomi (JP); Kazuo Ota, Komoro (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 17/087,811

(22) Filed: Nov. 3, 2020

(65) Prior Publication Data

US 2021/0140481 A1    May 13, 2021

(30) Foreign Application Priority Data

Nov. 8, 2019    (JP) .............................. JP2019-203050

(51) Int. Cl.
    *F16C 17/10*    (2006.01)
    *F16C 33/74*    (2006.01)
    (Continued)

(52) U.S. Cl.
    CPC ........ *F16C 33/6681* (2013.01); *F16C 17/105* (2013.01); *F16C 19/364* (2013.01);
    (Continued)

(58) Field of Classification Search
    CPC .. F16C 17/105; F16C 33/745; F16C 2202/60; F16C 2370/12; G11B 19/2036
See application file for complete search history.

(56) References Cited

U.S. PATENT DOCUMENTS

| | | | | |
|---|---|---|---|---|
| 5,112,142 A | * | 5/1992 | Titcomb ................ | F16C 17/105 277/361 |
| 5,822,152 A | * | 10/1998 | Seaver ................ | G11B 25/043 360/99.08 |

(Continued)

FOREIGN PATENT DOCUMENTS

| | | |
|---|---|---|
| JP | 2005-337295 A | 12/2005 |
| JP | 2007-170641 A | 7/2007 |

*Primary Examiner* — Phillip A Johnson
(74) *Attorney, Agent, or Firm* — Pearne & Gordon LLP

(57) ABSTRACT

A fluid dynamic bearing device prevents an oleophobic agent from wetting and spreading to a tapered seal portion, including lubricating oil C filled in a condition in which the oil is separated sandwiching a separator portion 240 holding a gas layer arranged between two conical bearing members 201, and two primary tapered seal portions 230 each connecting to one of both ends along an axial direction of the separator portion 240, wherein width in a radial direction of the two primary tapered seal portion 230 decreases as each approaches toward the two conical bearing members 201, a gas-liquid interface of the lubricating oil C is located each of the two primary tapered seal portions 230, an oleophobic agent blocking portion 250 is arranged at each of both ends in an axial direction of the separator portion 240, a separator central portion 244 is arranged between the oleophobic agent blocking portions 250 of the separator portions 240, and an oleophobic coating is formed at least at the separator central portion 244 of the separator portion 240.

8 Claims, 4 Drawing Sheets

(51) Int. Cl.
*F16C 33/66* (2006.01)
*F16C 19/36* (2006.01)

(52) U.S. Cl.
CPC ........ *F16C 33/745* (2013.01); *F16C 2202/60* (2013.01); *F16C 2370/12* (2013.01)

(56) References Cited

U.S. PATENT DOCUMENTS

| | | | |
|---|---|---|---|
| 2005/0058373 A1 | 3/2005 | Heine et al. | |
| 2007/0147715 A1 | 6/2007 | Kainoh et al. | |
| 2010/0195250 A1* | 8/2010 | Sekii | F16C 17/107 360/234.1 |
| 2010/0277831 A1* | 11/2010 | Efinger | F16C 17/105 360/99.08 |
| 2011/0123139 A1* | 5/2011 | Kimura | F16C 33/745 384/107 |
| 2018/0123417 A1* | 5/2018 | Showa | H02K 3/38 |
| 2018/0266482 A1* | 9/2018 | Showa | F16C 33/107 |

* cited by examiner

FLUID DYNAMIC BEARING DEVICE, SPINDLE MOTOR, AND HARD DISK DRIVE DEVICE

TECHNICAL FIELD

The present invention relates to a fluid dynamic bearing device, to a spindle motor, and to a hard disk drive device, and in particular, relates to a technique in which lubricating oil is prevented from leaking to the outside of a bearing by preventing an oleophobic agent from wetting and spreading to a tapered seal portion.

BACKGROUND ART

A spindle motor rotating recording disk of a hard disk drive device generally has a structure in which a rotating portion is rotatably supported at a fixing portion via a fluid dynamic bearing. As one kind of such a fluid dynamic bearing, for example, as shown in Patent Document 1, a conical bearing type is known in which lubricating oil is held between two conical bearing members arranged on a shaft fixed to a base portion and a sleeve portion of a rotating portion. Dynamic pressure is generated in accordance with the rotation of the rotating portion. A separator portion in which no lubricating oil is present is arranged between the two bearing members. Since the separator portion communicates with an outer space of the fluid dynamic bearing, there is no pressure difference between the separator portion and the outer space.

Between the separator portion and each bearing member, and between the sleeve portion and the shaft, a pumping seal portion and a tapered seal portion are formed (see Patent Document 2). The pumping seal portion flows the lubricating oil toward a fluid dynamic pressure generating portion. The tapered seal portion has a tapered surface at which a gas-liquid interface of the lubricating oil is formed. Furthermore, in the separator portion, an oleophobic coating is formed by coating an oleophobic agent on each of an inner circumferential surface of the sleeve portion and an outer circumferential surface of the shaft (see Patent Document 3). Since surface tension of the oleophobic agent is less than that of the lubricating oil, driving force of the lubricating oil wetting an area on which an oleophobic coating is formed is small. Therefore, the oleophobic coating prevents the lubricating oil from being moved to the separator side by an impact or the like, and the lubricating oil is prevented from leaking to the outside of the bearing. It should be noted that the oleophobic agent is coated in a condition in which it is dissolved or dispersed in a solvent, and the solvent is removed by heating so as to form the oleophobic coating.

Patent Document 1 is Japanese Unexamined Patent Application Publication No. 2005-337295.

Patent Document 2 is US publication No. 2005-58373A1.

Patent Document 3 is Japanese Unexamined Patent Application Publication No. 2007-170641.

SUMMARY OF THE INVENTION

In a conventional conical bearing type fluid dynamic bearing, the oleophobic coating may be formed even on a portion of the tapered seal portion during coating of the oleophobic agent on the separator portion in a production process, in case the oleophobic agent wets and spreads to the tapered seal portion. In this case, the gas-liquid interface at the tapered seal portion may be formed in an inappropriate shape and there is a possibility that the lubricating oil will leak to the outside of the bearing by an external impact or the like.

Such a phenomenon is explained with reference to FIG. 7. FIG. 7A is a diagram showing the tapered seal portion of the fluid dynamic bearing, and shows a condition in which the lubricating oil C forms an appropriate gas-liquid interface on the tapered surface of the tapered seal portion. When the oleophobic coating is formed after the oleophobic agent wets and spreads on the tapered seal portion, as shown in FIG. 7B, the gas-liquid interface of the lubricating oil C would be a convex curved surface due to difference in surface tension of the oleophobic agent. Therefore, there is a possibility that the lubricating oil C will fall out and leak to the outside of the bearing by an external impact or the like.

The present invention has been completed in view of the above circumstances, and an object of the present invention is to provide a fluid dynamic bearing device in which the oleophobic agent is prevented from wetting and spreading to the tapered seal portion. Furthermore, an object of the present invention is to provide a spindle motor in which such a fluid dynamic bearing device is used, and a hard disk drive device in which such a spindle motor is used.

The present invention is a fluid dynamic bearing device including: a fixing portion having a shaft and two conical bearing members fixed to the shaft; a rotating portion supported relatively rotatably with respect to the fixing portion; two dynamic bearing portions formed by conical bearing surfaces arranged on the two conical bearing members and two rotor side conical surfaces which are inner circumferential surfaces of the rotating portion facing the conical bearing surfaces; and a lubricating oil filled in the two dynamic bearing portions, in which the lubricating oil is filled in a condition in which the oil is separated sandwiching a separator portion holding an air layer and being arranged between the two conical bearing members, two primary tapered seal portions respectively connecting to each axial end of the separator portion are arranged, widths in a radial direction of the two primary tapered seal portions are shortened approaching toward the two conical bearing members, a gas-liquid interface of the lubricating oil is located at each of the two primary tapered seal portions, an oleophobic agent blocking portion is arranged at each axial end of the separator portion, a separator central portion is arranged between the oleophobic agent blocking portions of the separator portion, and an oleophobic coating is formed at least at the separator central portion of the separator portion.

According to the fluid dynamic bearing device of the present invention, since the oleophobic agent is prevented from wetting and spreading to the primary tapered seal portion by the oleophobic agent blocking portion, the oleophobic coating will not be formed in a part of the primary tapered seal portion. The gas-liquid interface is formed in an appropriate shape. Therefore, the lubricating oil can be prevented from leaking to the outside of the bearing.

BEST MODE FOR CARRYING OUT THE INVENTION

Hard Disk Drive Device

Figure 1:
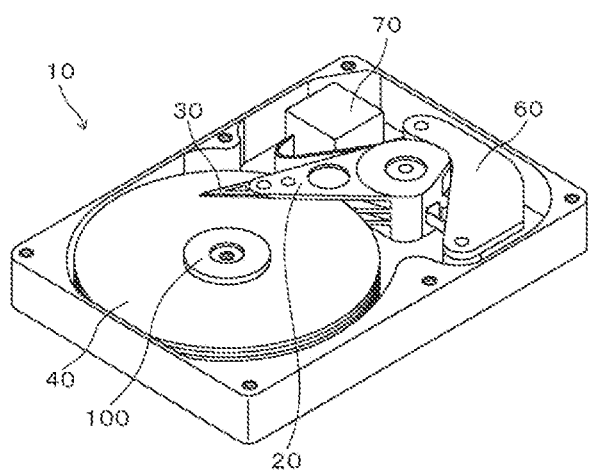
FIG. 1 is a perspective view showing the hard disk drive device of the Embodiment of the present invention.

FIG. 1 is a perspective view showing an overall structure of a hard disk drive device 10 in which a spindle motor according to the present invention is used. As shown in FIG. 1, the hard disk drive device 10 includes a spindle motor 100 and multiple hard disks 40 rotated by the spindle motor 100. Furthermore, the hard disk drive device 10 includes a swing arm 20 which supports multiple magnetic heads 30, each of which faces the hard disk 40, an actuator 60 driving the swing arm 20, and a control portion 70 which controls these devices.

Spindle Motor

Figure 2:
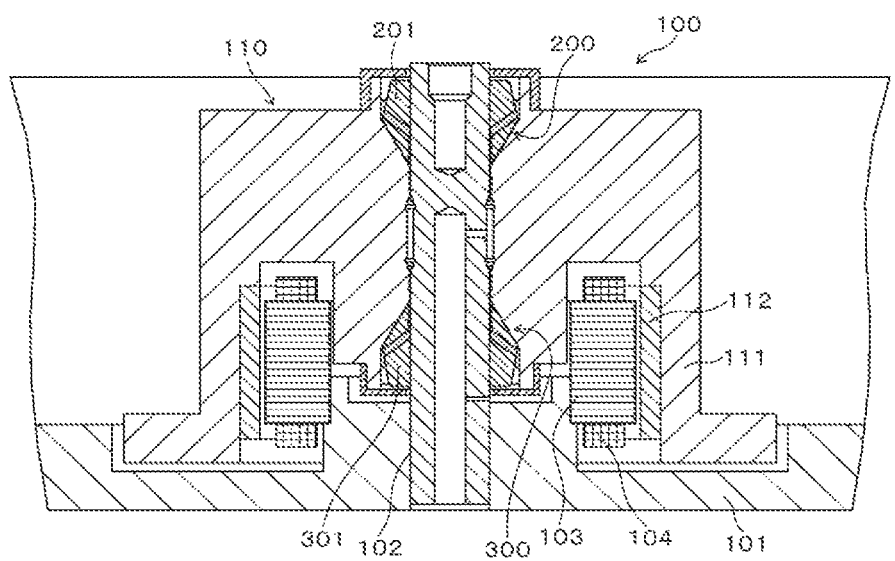
FIG. 2 is a cross sectional view showing the spindle motor of the Embodiment of the present invention.

FIG. 2 is a cross sectional view of the spindle motor 100 of the Embodiment which is cut by a surface including the rotation axis. A fixing portion of the spindle motor 100 includes a base portion 101, and a shaft 102 on which a conical bearing member 201 and a conical bearing member 301 are fixed. The shaft 102 is fixed to the base portion 101. A stator core 103 is also fixed to the base portion 101. The stator core 103 is made by layering multiple thin sheets of soft magnetic material (for example, electromagnetic steel plate) along an axial direction, has a circular shape, and has multiple pole teeth projecting outwardly in a radial direction. The multiple pole teeth are arranged along a circumferential direction at even intervals therebetween, and coil 104 is wound around each of them.

A rotating portion of the spindle motor 100 includes a rotor 110 and a rotor magnet 112. The rotor 110 has an outer circular cylindrical portion 111, and the rotor magnet 112 having circular shape is fixed to an inner circumferential side of the outer circular cylindrical portion 111. The rotor magnet 112 is magnetized so that mutually adjacent portions are alternately different poles S, N, S, N . . . along a circumferential direction. An inner circumference of the rotor magnet 112 faces an outer circumference of the pole teeth of the stator core 103 having a gap therebetween.

Each outer circumferential surface of the conical bearing members 201, 301 and the shaft 102 and an inner circumferential surface of the rotor 110, form a fluid dynamic bearing 200 and a fluid dynamic bearing 300. The rotor 110 is rotatably supported with respect to the shaft 102 by the fluid dynamic bearing 200 and the fluid dynamic bearing 300. Each of the conical bearing member 201 and the conical bearing member 301 is arranged at one of one end side and the other end side of the shaft 102.

By supplying driving current to the coil 104, driving force to rotate the rotor magnet 112 is generated, and the rotor 110 rotates with respect to the shaft 102 and the base portion 101 around the shaft 102 as an axis. This principle is similar to that of an ordinary spindle motor.

Fluid Dynamic Bearing

1. First Embodiment

Figure 3:
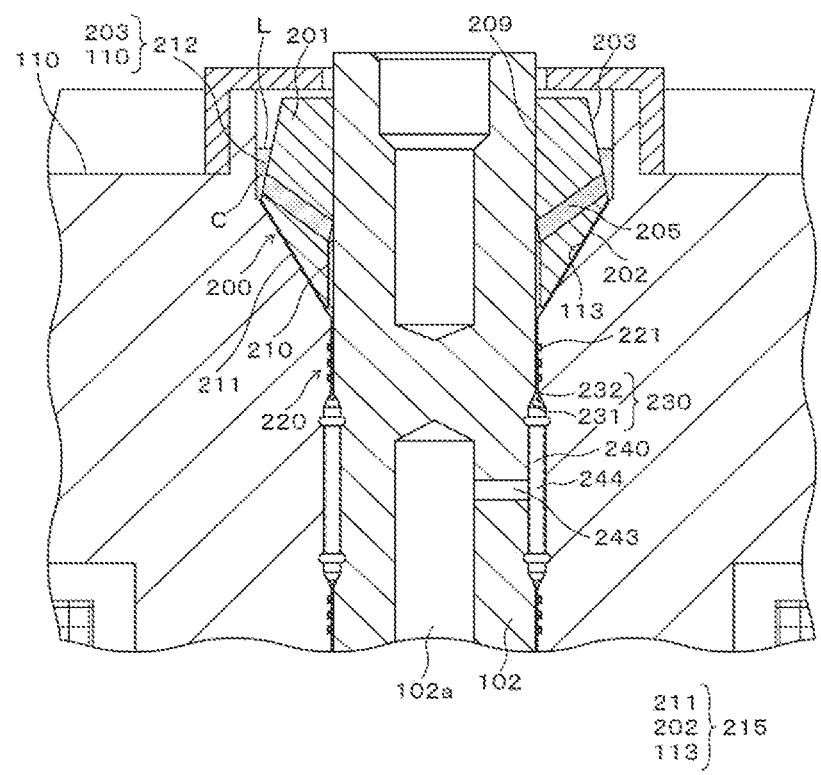
FIG. 3 is a cross sectional view in which a vicinity of the portion of the fluid dynamic bearing device of the First Embodiment of the present invention is magnified.

Hereinafter the fluid dynamic bearing 200 and the fluid dynamic bearing 300 of the First Embodiment are explained. The fluid dynamic bearing 200 includes the conical bearing member 201 fixed to the shaft 102, and the fluid dynamic bearing 300 includes the conical bearing member 301 fixed to the shaft 102 (see FIG. 2). In the following explanation, FIG. 3 is referred to and explained by exemplifying the fluid dynamic bearing 200. FIG. 3 shows a part around the fluid dynamic bearing 200 enlarged.

A through hole 209 extending along an axial direction is formed at the center of the conical bearing member 201. The conical bearing member 201 and the shaft 102 are unified by press-fitting the shaft 102 into the through hole 209. It should be noted that the conical bearing member 201 and the shaft 102 can be unified by an adhesive or by laser welding.

The conical bearing member 201 includes a conical bearing surface 202 and a seal conical surface 203 as a radially outward surface. The conical bearing surface 202 and a rotor side conical surface 113 arranged on inner circumferential surface of the rotor 110 face each other via a small gap 211, so as to form a dynamic bearing portion 215. A dynamic pressure groove is formed on at least one of the conical bearing surface 202 and the rotor side conical bearing surface 113, and the gap 211 is filled with lubricating oil C.

A secondary tapered seal portion 212 is arranged between the seal conical surface 203 and an inner circumferential surface of the rotor 110. The secondary tapered seal portion 212 is formed along the entire circumference. As shown in FIG. 3, the secondary tapered seal portion 212 is formed a tapered shape in which the size of the gap increases gradually from axial downward to axial upward. The surface of the liquid is located at the secondary tapered seal portion 212 so that the lubricating oil C is prevented from leaking by capillary force. In the FIG. 3, the liquid surface of the lubricating oil C held in the secondary tapered seal portion 212 is indicated by reference letter L.

A gap 210 which is a circular space is arranged between an end portion of an inner circumferential surface of the conical bearing member 201 and the outer circumferential surface of the shaft 102. The gap 210 and the secondary tapered seal portion 212 communicate via a circulation hole 205. The circulation hole 205 is arranged at two locations along a circumferential direction at even intervals therebetween seen from an axial direction. The gap 210 and the abovementioned gap 211 communicate with each other. According to these, the secondary tapered seal portion 212, the circulation hole 205, and gaps 210 and 211 communicate with each other in a condition in which the lubricating oil C is arranged therein and is movable among them. As the lubricating oil C, for example, lubricating oil having a base oil of a synthetic hydrocarbon oil such as PAO (poly-α-olefin) or ester type oil is exemplified appropriately; however, other types may also be used.

On an inner circumferential surface of the rotor 110, a pumping seal portion 220 is arranged at the lower side of an intersection of the gap 210 and the gap 211 along the entire circumference. In this Embodiment, the pumping seal portion 220 includes a pumping seal groove 221 which extends in an oblique direction seen from a radial direction on the inner circumferential surface of the rotor 110. The pumping seal groove 221 generates a pressure gradient in the lubricating oil C accompanied by rotation of the rotor 110.

According to this, the lubricating oil C is sent to the gap 210 side. It should be noted that the pumping seal groove 221 can be formed on the outer circumferential surface of the shaft 102, or on both the inner circumferential surface of the rotor 110 and the outer circumferential surface of the shaft 102.

Figure 4:
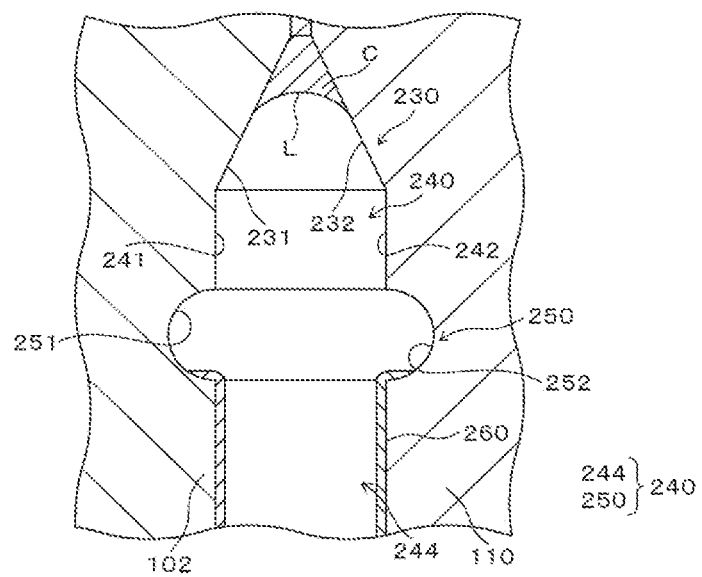
FIG. 4 is a cross sectional view showing a vicinity of the oleophobic agent blocking portion in the First Embodiment of the present invention.

As shown in FIG. 4, a primary tapered seal portion 230 is arranged between the shaft 102 and the rotor 110. The primary tapered seal portion 230 is located at the lower side of the pumping seal portion 220. The primary tapered seal portion 230 includes an inner tapered surface 231 and an outer tapered surface 232. The inner tapered surface 231 is formed on an outer circumferential surface of the shaft 102. The outer tapered surface 232 is formed on an inner circumferential surface of the rotor 110. The primary taper seal portion 230 is formed in a tapered shape in which a size of a gap increases gradually from the pumping seal portion 220 side to the opposite side in an axial direction. A gas-liquid interface is located at the primary tapered seal portion 230 so that the lubricating oil C is prevented from leaking by capillary force. It should be noted that the primary tapered seal portion 230 may include only one of the inner tapered surface 231 and the outer tapered surface 232. In FIG. 4, the gas-liquid interface of the lubricating oil C held in the primary tapered seal portion 230 is indicated by reference letter L. Length along an axial direction of the primary tapered seal portion 230 is about one tenth that of the secondary tapered seal portion 212, and volume of the primary tapered seal portion 230 is less than that of the secondary tapered seal portion 212. In addition, a radial width around a center along an axial direction of the primary tapered seal portion 230 is set to be less than that of the secondary tapered seal portion 212. It is desirable that the gas-liquid interface of the lubricating oil C in a standing still condition be located around a center along an axial direction of the tapered seal portion. Since the capillary force is inversely proportion to diameter of the capillary, a force holding the lubricating oil C of the primary tapered seal portion 230 is greater than that of the secondary tapered seal portion 212.

Between the shaft 102 and the rotor 110, a separator portion 240 holding gas layer is arranged at the lower side of the primary tapered seal portion 230. The separator portion 240 is defined by a shaft small diameter portion 241 formed on the outer circumferential surface of the shaft 102 and a rotor large diameter portion 242 formed on an inner circumferential surface of the rotor 110. The separator portion 240 includes a separator central portion 244 at an inside along an axial direction. It should be noted that the separator portion 240 can be defined only by one of the shaft small diameter portion 241 and the rotor large diameter portion 242. The separator central portion 244 communicates with an outer space of the fluid dynamic bearing 200 via a communicating hole 243 and a hole 102a formed in the shaft 102. Since the separator portion 240 communicates the outer space of the fluid dynamic bearing 200, there is no pressure difference between the separator portion 240 and the outer space.

Furthermore, at an axial end of the separator portion 240, an oleophobic agent blocking portion 250 is arranged adjacent to the separator central portion 244. As shown in FIG. 4, the oleophobic agent blocking portion 250 includes an inner circumferential groove 251 and an outer circumferential groove 252. The inner circumferential groove 251 has semicircular cross section and is formed on an outer circumferential surface of the shaft 102. The outer circumferential groove 252 has semicircular cross section and is formed on an inner circumferential surface of the rotor 110. The oleophobic agent blocking portion 250 can include only one of the inner circumferential groove 251 or the outer circumferential groove 252.

An oleophobic agent is coated so as to form an oleophobic coating 260 on the separator central portion 244. The oleophobic agent is one in which a fluorine type polymer having a perfluoroalkyl group, for example, is dissolved or dispersed by a solvent. The oleophobic coating 260 is formed by removing the solvent by heat after coating the oleophobic agent. It should be noted that the oleophobic coating 260 can also be formed on the oleophobic agent blocking portion 250, and cannot be formed on the primary tapered seal portion 230.

The above explanation is for the structure of the First Embodiment. The fluid dynamic bearing 300 has a structure in which the fluid dynamic bearing 200 is inverted to be upside down, and since each of its constituent elements is the same as that of the fluid dynamic bearing 200, explanation is omitted.

In the fluid dynamic bearing 200 having the above structure, during coating of the oleophobic agent on the separator portion 240, the oleophobic agent spreading toward the primary tapered seal portion 230 is held in the inner circumferential groove 251 and the outer circumferential groove 252 of the oleophobic agent blocking portion 250 and is prevented from entering into the primary tapered seal portion 230. Therefore, the oleophobic coating 260 is not formed on a part of the primary tapered seal portion 230, and the gas-liquid interface is formed in an appropriate shape. Therefore, the lubricating oil C is prevented from leaking to the outside of the bearing.

In particular, in the First Embodiment, the inner circumferential groove 251 and the outer circumferential groove 252 of the oleophobic agent blocking portion 250 can be easily processed by lathe turning processing of the shaft 102 and the rotor 110. Furthermore, in the First Embodiment, the secondary tapered seal portion 212 is arranged communicating the gap 211. Thus, the lubricating oil C is prevented from leaking from the gap 211 by capillary force generated at the lubricating oil C located in the secondary tapered seal portion 212.

In the above First Embodiment, the lubricating oil C cannot flow too much from the gap 211 to the primary tapered seal portion 230 due to the pumping seal portion 220 arranged between the conical bearing member 201 and the primary tapered seal portion 230. Also, the volume of the secondary tapered seal portion 212 is set to be greater than that of the primary tapered seal portion 230. Therefore, there is little influence on sealing performance of the secondary tapered seal portion 212, even when the pumping seal portion 220 facilitates the flow of the lubricating oil C toward the secondary tapered seal portion 212 through the gap 210 and the circulation hole 205.

2. Second Embodiment

Figure 5:
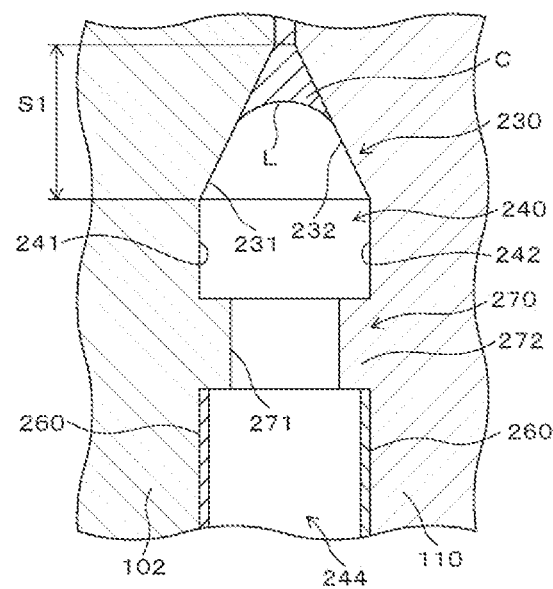
FIG. 5 is a cross sectional view showing a vicinity of the oleophobic agent blocking portion in the Second Embodiment of the present invention.

FIG. 5 is a diagram showing the Second Embodiment. In the Second Embodiment, at an axial end of the separator portion 240, an oleophobic agent blocking portion 270 is arranged adjacent to the separator central portion 244. The oleophobic agent blocking portion 270 includes an inner projection 271 formed on an outer circumferential surface of the shaft 102 and an outer projection 272 formed on an inner circumferential surface of the rotor 110. It should be noted that the oleophobic agent blocking portion 270 can include only one of the inner projection 271 and the outer projection 272.

In such a fluid dynamic bearing 200, during coating of the oleophobic agent on the separator central portion 244, the oleophobic agent spreading toward the primary tapered seal portion 230 is blocked by the oleophobic agent blocking portion 270 and is prevented from entering into the primary tapered seal portion 230. Therefore, the oleophobic coating 260 cannot be formed on a part of the primary tapered seal portion 230, and the gas-liquid interface of the lubricating oil C is formed in an appropriate shape. Therefore, the lubricating oil C can be prevented from leaking to the outside of the bearing. In addition, the oleophobic agent blocking portion 270 can be easily processed by lathe turning processing of the shaft 102 and the rotor 110. For example, when processing the separator portion 240 by lathe turning, the processing may be performed with the portion corresponding to the oleophobic agent blocking portion 270 remaining.

Furthermore, surface roughness of a region defining the separator central portion 244 in the shaft small diameter portion 241 of the shaft 102 and the rotor large diameter portion 242 of the rotor 110 can be larger than that of the other regions. By increasing surface roughness, since wettability with the oleophobic agent is relatively increased, wetting and spreading of the oleophobic agent to the primary tapered seal portion 230 can be further restrained. The region in which surface roughness is set to be large can be arranged in a part of, or all of, the region defining the separator central portion 244 of the shaft small diameter portion 241 and the rotor large diameter portion 242.

3. Third Embodiment

Figure 6:
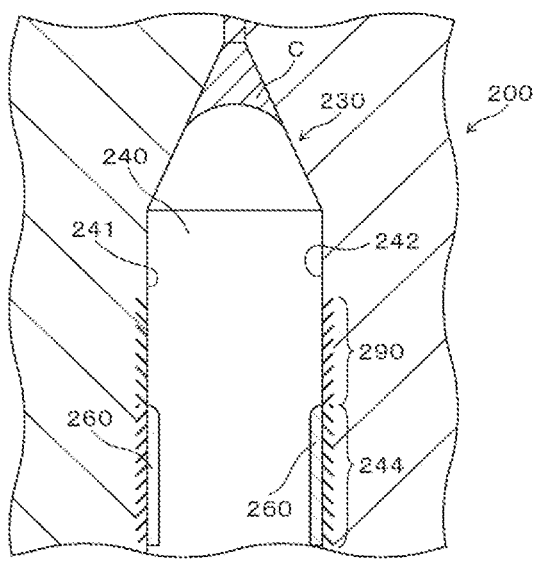
FIG. 6 is a cross sectional view showing a vicinity of the oleophobic agent blocking portion in the Third Embodiment of the present invention.
Figure 7A:
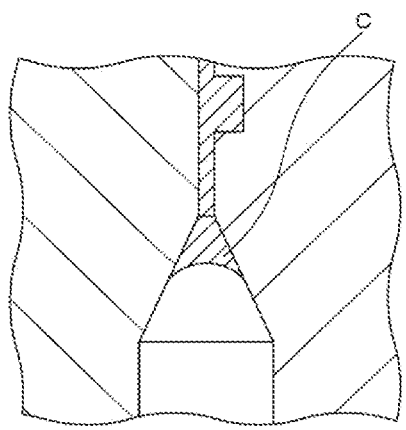
FIGS. 7A-7B are cross sectional views showing the tapered seal portion for explanation of an object in a conventional technique.
Figure 7B:
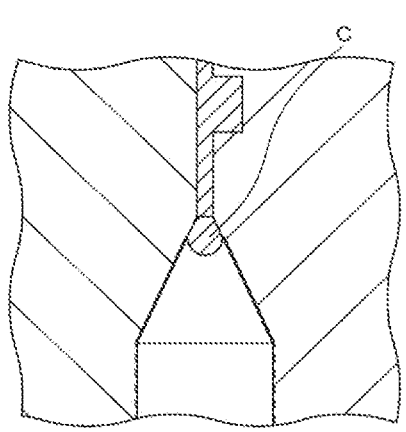

The Third Embodiment of the present invention is explained with reference to FIG. 6. In this Third Embodiment, an oleophobic agent blocking portion 290 is arranged on the separator portion 240. Surface roughness of the oleophobic agent blocking portion 290 is greater than that of the primary tapered seal portion 230. In such a fluid dynamic bearing 200, wettability of the oleophobic agent blocking portion 290 with respect to the oleophobic agent is greater than that of the primary tapered seal portion 230. Therefore, during coating the oleophobic agent, the oleophobic agent is held on the oleophobic agent blocking portion 290 and is prevented from wetting and spreading to the primary tapered seal portion 230. Therefore, the oleophobic coating 260 will not be formed on a part of the primary tapered seal portion 230. Thus, the lubricating oil C is prevented from leaking to the outside of the bearing due to an appropriate shape of the gas-liquid interface of the lubricating oil C.

Surface roughness of the separator central portion 244 can be greater than that of the oleophobic agent blocking portion 290. By arranging such oleophobic agent blocking portion 290, the oleophobic agent is held on the separator central portion 244, and is blocked from entering into the primary tapered seal portion 230.

It is further effective when the abovementioned embodiments are combined. That is, the surface roughness of the separator central portion 244 is set to be greater than that of the oleophobic agent blocking portion 290, and the surface roughness of the oleophobic agent blocking portion 290 is set to be greater than that of the primary tapered seal portion 230. By arranging such a relationship of the surface roughness, the oleophobic agent is more likely to be held on the shaft small diameter portion 241 and the rotor large diameter portion 242. Even if the oleophobic agent wets and spreads to the oleophobic agent blocking portion 290, the oleophobic agent is held at the oleophobic agent blocking portion 290 because the surface roughness of the oleophobic agent blocking portion 290 is greater than that of the primary tapered seal portion 230. Therefore, the oleophobic agent is blocked from entering into the primary tapered seal portion 230.

The present invention can be utilized in a fluid dynamic bearing device, and the fluid dynamic bearing device can be used in a spindle motor and a hard disk drive device.

EXPLANATION OF REFERENCE NUMERALS

10 . . . Hard disk drive device, 100 . . . spindle motor, 101 . . . base portion, 102 . . . shaft, 110 . . . rotor, 111 . . . outer circular cylindrical portion, 112 . . . rotor magnet, 113 . . . rotor side conical surface, 200 . . . fluid dynamic bearing, 201 . . . conical bearing member, 202 . . . conical bearing surface, 203 . . . seal conical surface, 215 . . . dynamic bearing portion, 205 . . . circulation hole, 209 . . . through hole, 212 . . . secondary tapered seal portion, 220 . . . pumping seal portion, 221 . . . pumping seal groove, 230 . . . primary tapered seal portion, 231 . . . inner tapered surface, 232 . . . outer tapered surface, 240 . . . separator portion, 241 . . . shaft small diameter portion, 242 . . . rotor large diameter portion, 243 . . . communicating hole, 244 . . . separator central portion, 250 . . . oleophobic agent blocking portion, 251 . . . inner circumferential groove, 252 . . . outer circumferential groove, 260 . . . oleophobic coating, 270 . . . oleophobic agent blocking portion, 271 . . . inner projection, 272 . . . outer projection, 290 . . . oleophobic agent blocking portion, 300 . . . fluid dynamic bearing, 301 . . . conical bearing member, C . . . lubricating oil.

What is claimed is:

1. A fluid dynamic bearing device comprising:
   a fixing portion having a shaft and two conical bearing members fixed to the shaft,
   a rotating portion supported relatively rotatably with respect to the fixing portion,
   two dynamic bearing portions formed by conical bearing surfaces arranged on the two conical bearing members and two rotor side conical surfaces which are inner circumferential surfaces of the rotating portion facing the conical bearing surfaces, and
   a lubricating oil arranged in the two dynamic bearing portions,
   wherein the lubricating oil is arranged being separated by a separator portion, the separator portion holds an air layer and is arranged between the two conical bearing members,
   two primary tapered seal portions are respectively connected to each axial end of the separator portion,
   widths in a radial direction of the two primary tapered seal portions are shortened approaching toward the two conical bearing members,
   a gas-liquid interface of the lubricating oil is located at each of the two primary tapered seal portions,
   an oleophobic agent blocking portion is arranged at each axial end of the separator portion,
   a separator central portion is arranged between each oleophobic agent blocking portion of the separator portion, and
   an oleophobic coating is formed at least at the separator central portion of the separator portion.

2. The fluid dynamic bearing device according to claim 1, wherein the oleophobic agent blocking portion includes a circumferential groove or circular projection extending along a circumferential direction on an outer circumferential surface of the shaft and/or on an inner circumferential surface of the rotating portion.

3. The fluid dynamic bearing device according to claim 1, wherein the oleophobic agent blocking portion is constructed by a surface property portion having higher wettability with respect to the oleophobic agent than that of the primary tapered seal portion.

4. The fluid dynamic bearing device according to claim 3, wherein surface roughness of the oleophobic agent blocking portion is greater than that of the primary tapered seal portion.

5. The fluid dynamic bearing device according to claim 1, wherein the oleophobic agent blocking portion is constructed by a surface property portion having lower wettability with respect to the oleophobic agent than that of the separator central portion.

6. The fluid dynamic bearing device according to claim 5, wherein surface roughness of the oleophobic agent blocking portion is less than that of the separator central portion.

7. A spindle motor comprising the fluid dynamic bearing device according to claim 1.

8. A hard disk drive device comprising the spindle motor according to claim 7.

* * * * *